(12) United States Patent
Cohen et al.

(10) Patent No.: US 11,924,249 B2
(45) Date of Patent: Mar. 5, 2024

(54) SYSTEM AND METHOD FOR DISTANCE BASED SECURED COMMUNICATION OVER AN UNSECURE COMMUNICATION CHANNEL

(71) Applicant: sensePass LTD., Ness Ziona (IL)

(72) Inventors: Chen Cohen, Ness Ziona (IL); Moty Arcuschin, Ness Ziona (IL); Nir Alperovitch, Ness Ziona (IL)

(73) Assignee: sensePass LTD., Ness Ziona (IL)

( * ) Notice: Subject to any disclaimer, the term of this patent is extended or adjusted under 35 U.S.C. 154(b) by 578 days.

(21) Appl. No.: 16/633,187

(22) PCT Filed: Jul. 24, 2018

(86) PCT No.: PCT/IL2018/050819
§ 371 (c)(1),
(2) Date: Jan. 23, 2020

(87) PCT Pub. No.: WO2019/021279
PCT Pub. Date: Jan. 31, 2019

(65) Prior Publication Data
US 2020/0169583 A1 May 28, 2020

(30) Foreign Application Priority Data
Jul. 24, 2017 (IL) .......................................... 253632

(51) Int. Cl.
*H04L 9/40* (2022.01)
*H04W 12/06* (2021.01)
(Continued)

(52) U.S. Cl.
CPC .......... *H04L 63/18* (2013.01); *H04L 63/0846* (2013.01)

(58) Field of Classification Search
CPC . H04L 63/18; H04L 63/0846; H04L 63/0853; H04L 63/107; H04L 63/0807;
(Continued)

(56) References Cited

U.S. PATENT DOCUMENTS 10,438,198 B1 * 10/2019 Griffin ................... H04L 9/3213
11,308,481 B1 * 4/2022 Thomas ............. G06Q 20/4012
(Continued)

FOREIGN PATENT DOCUMENTS

EP           2929671           2/2017

OTHER PUBLICATIONS

International Search Report of Application No. PCT/IL2018/050819 dated Sep. 16, 2018.
(Continued)

*Primary Examiner* — Amie C. Lin
(74) *Attorney, Agent, or Firm* — PEARL COHEN ZEDEK LATZER BARATZ LLP

(57) ABSTRACT

Methods and systems for secure communication over an unsecure communication channel, including a server, to send at least one access token to a computerized device over a secured communication channel, and a terminal, to receive from the computerized device, over an unsecure communication channel, at least a second token, where said second token is based on the access token received from the server.

16 Claims, 5 Drawing Sheets

(51) Int. Cl.
*H04W 12/61* (2021.01)
*H04W 12/63* (2021.01)

(58) Field of Classification Search
CPC ........... H04L 63/0838; H04L 2209/56; H04W 12/06; H04W 12/63; H04W 12/61; G06Q 20/385; G06Q 2220/00
See application file for complete search history.

(56) References Cited

U.S. PATENT DOCUMENTS

| | | |
|---|---|---|
| 11,354,631 B1* | 6/2022 | Hill .................... G06Q 20/4037 |
| 2006/0090197 A1 | 4/2006 | Hermann et al. |
| 2011/0016047 A1 | 1/2011 | Wu et al. |
| 2012/0235812 A1 | 9/2012 | Maia et al. |
| 2013/0267176 A1 | 10/2013 | Hertel et al. |
| 2015/0254655 A1* | 9/2015 | Bondesen .......... G06Q 20/3821 |
| | | 705/72 |
| 2016/0224977 A1 | 8/2016 | Sabba et al. |
| 2017/0118202 A1 | 4/2017 | Mathew et al. |
| 2017/0295155 A1* | 10/2017 | Wong .................... H04L 67/306 |

OTHER PUBLICATIONS

European Search Report for Application No. EP18839216.1, dated Mar. 1, 2021.
Office Action For Israeli Application No. 253632, dated Jan. 4, 2021.

* cited by examiner

| TOKEN | TIME PERIOD/SLOT |
|---|---|
| TOKEN 1 | TIME PERIOD 1 |
| TOKEN 2 | TIME PERIOD 2 |
| TOKEN 3 | TIME PERIOD 3 |
| TOKEN N | TIME PERIOD N |

Fig. 5

SYSTEM AND METHOD FOR DISTANCE BASED SECURED COMMUNICATION OVER AN UNSECURE COMMUNICATION CHANNEL

CROSS-REFERENCE TO RELATED APPLICATIONS

This application is a National Phase Application of PCT International Application No. PCT/IL2018/050819, International Filing Date Jul. 24, 2018, claiming priority of Israel Patent Application No. 253632, filed Jul. 24, 2017, which are hereby incorporated by reference.

FIELD OF THE INVENTION

The present invention relates to data communication systems. More particularly, the present invention relates to systems and methods for distance based secure communication between unidentified parties over an unsecured communication channel.

BACKGROUND OF THE INVENTION

Communication systems may require a secure communication channel in order to securely transfer data between paired (or identified) parties. For instance an automatic teller machine (ATM) is securely connected to servers of a bank. Such secure connection allows secure data transfer between the servers and the paired ATM, e.g. to withdraw money from the ATM after authentication by the servers of user identification at the ATM based on a user database at the bank servers.

However, some desired data transfers for secure communication are only occasional and may involve devices that do not have a constant secure connection with corresponding secure servers and/or unidentified devices that are not paired therebetween. While some devices are capable of wirelessly transferring data to unpaired devices (e.g., based on proximity determined via Bluetooth beacons) there is currently no way to securely transfer data over an unsecured channel to unidentified devices.

SUMMARY OF THE INVENTION

There is thus provided, in accordance with some embodiments of the invention, a secure communication system for communicating over an unsecure communication channel, the system including a server, to send at least one access token to a computerized device over a secured communication channel, and a terminal, to receive from the computerized device, over an unsecure communication channel, at least a second token, said second token is based on the access token received from the server.

In some embodiments, the server may send the at least one access token to the computerized device upon receipt from the computerized device of a command. In some embodiments, the access token may be generated based on the command. In some embodiments, the terminal may be configured to execute the command received from the computerized device once the received token is authenticated.

In some embodiments, the server may send the at least one access token to the computerized device upon receipt from the computerized device of at least one data packet, wherein the terminal may be configured to receive the at least one data packet from the computerized device once the received token is authenticated. In some embodiments, the at least one data packet may include a unique identification of the computerized device.

In some embodiments, the at least one data packet may include a command to be executed by the terminal. In some embodiments, the terminal may be configured to send over a secured communication channel, the received token to the server, and wherein the server may send the command for execution by the terminal, wherein the authentication is performed by the server. In some embodiments, the server may include a token generator, wherein the token generator is configured to generate the token based on the received at least one data packet.

In some embodiments, the server may be configured to send the command for execution by the terminal, wherein the authentication is performed by the terminal In some embodiments, the system may include a communication module, coupled to the terminal and configured to allow communication between the terminal and the server, and also configured to allow communication between the terminal and the computerized device. In some embodiments, the communication may be at least partially wireless.

In some embodiments, the system may include at least one sensor, coupled to the terminal and configures to detect presence of the computerized device in a predetermined area in proximity to the at least one sensor. In some embodiments, the terminal may be configured to receive from the computerized device the at least one access token upon detection of the computerized device in a predetermined area in proximity to the at least one sensor. In some embodiments, the at least one sensor may be configured to determine the distance between the sensor and the computerized device.

In some embodiments, the at least one sensor may be configured to determine if the distance between the sensor and the computerized device changes during communication therewith. In some embodiments, the received at least one access token may correspond to the terminal to execute the received command In some embodiments, the received at least one access token may include a timeout period and expires after the timeout period elapses.

There is thus provided, in accordance with some embodiments of the invention, a secure communication system for communication over an unsecure communication channel, the system including at least two computerized devices, wherein the at least two computerized devices are in active communication therebetween over an unsecure communication channel, and a server, in active communication with each of the at least two computerized devices over a secure communication channel. In some embodiments, at least a first computerized device of the at least two computerized devices, may be configured to transmit a first data packet to the server over the secure communication channel, wherein at least a second computerized device of the at least two computerized devices, may be configured to transmit a second data packet to the server over the secure communication channel. In some embodiments, the server may be configured to generate a token, and transmit the token over the secured communication channel back to the first device, wherein a second computerized device, of the at least two computerized devices, may be configured to receive from the first computerized device, over an unsecure communication channel, the token received from the server. In some embodiments, the second computerized device may be configured to determine compliance of the token. In some embodiments, the second computerized device may be configured to receive from the server, over the secured communication channel, the first data packet sent from the first computerized device, and wherein the first computerized device may be configured to receive from the server, over the secured communication channel, the second data packet sent from the second computerized device.

There is thus provided, in accordance with some embodiments of the invention, a secure communication system for location based communication over an unsecure communication channel, the system including at least two computerized devices, wherein the at least two computerized devices are in active communication therebetween over an unsecure communication channel, and are unidentified to each other, and a server, in active communication with each of the at least two computerized devices over a secure communication channel. In some embodiments, at least a first computerized device of the at least two computerized devices, may be configured to transmit a request to the server over the secure communication channel. In some embodiments, the server may be configured to generate a token, and transmit the token over the secured communication channel back to the first device, wherein a second computerized device, of the at least two computerized devices, may be configured to receive from the first computerized device, over an unsecure communication channel, the token received from the server, and configured to receive from the server, over the secured communication channel, the request sent from the first computerized device. In some embodiments, the second computerized device may be configured to determine compliance of the token and the request and execute the request based on the determined compliance.

In some embodiments, the server may include a first token generator, wherein the first token generator may be configured to generate the token based on the received request. In some embodiments, the server may include a second token generator, wherein the second token generator may be configured to generate modified tokens to be sent simultaneously with tokens generated by the first token generator. In some embodiments, the at least two computerized devices may be located within a predefined distance from each other, and wherein communication over the unsecure communication channel may be carried out based on the relative distance between the at least two computerized devices.

There is thus provided, in accordance with some embodiments of the invention, a method of secure communication over an unsecure communication channel, the method including receiving, by a computerized device, at least one access token generated by a server, sending, by the computerized device, at least a second token, based on at least one of the received at least one access token, to a terminal, over an unsecure communication channel, and authenticating the received at least one access token.

In some embodiments, the method includes receiving, by the remote server over a secure communication channel, a command from the computerized device to be executed by the terminal and executing the command by the terminal based on the authentication. In some embodiments, authenticating may include comparing the received access token and the generated access token.

In some embodiments, the method includes sending, by the terminal over a secure communication channel, the received at least one access token to the server, and sending, by the server, the command from the computerized device to the terminal, wherein the authentication is performed by the server.

In some embodiments, the method includes sending, by the server, the command from the computerized device to the terminal, wherein the authentication may be performed by the terminal In some embodiments, the method includes receiving, by the computerized device, a token pattern from the server, and sending, by the computerized device, an identification number of the computerized device to the server if the received access token complies with the received token pattern.

In some embodiments, the authentication may include determining compliance of the received token with at least one rule. In some embodiments, the token may be generated by applying a token generation algorithm on the received command and compliance is determined if the received token corresponds with the received command.

In some embodiments, the method includes issuing an alert to the server upon detection of an access token that does not comply with the received token pattern. In some embodiments, the method includes detecting, with at least one sensor, presence of the computerized device in a predetermined area in proximity to the at least one sensor. In some embodiments, the method includes determining, with the at least one sensor, the distance between the sensor and the computerized device, and blocking, by the server, sending of access tokens to the computerized device if the determined distance is larger than a predetermined value.

In some embodiments, the method includes determining, with the at least one sensor, the distance between the sensor and the computerized device, and blocking, by the server, sending of access tokens to the computerized device if the determined distance changes in a predetermined time period. In some embodiments, the method includes randomly creating, by the server, at least one access token.

In some embodiments, each of the at least one rule may be associated with an action to be performed by at least one terminal, and wherein each of the at least one terminal is configured to execute the action associated with the at least one rule, according to the compliance of the received token with the rule associated with the action.

In some embodiments, the method includes sending by the computerized device at least a third token, wherein the at least third token is a fake token. In some embodiments, receiving by the computerized device may include receiving at least one set of tokens, each of the tokens in the set of tokens, has an expiration period, wherein the at least second token may be based on at least one token of the set of tokens, and wherein authenticating of the received at least one second token may include checking that the at least second token is received prior to the expiration period of the at least second token has elapsed.

There is thus provided, in accordance with some embodiments of the invention, a method of secure communication over an unsecure communication channel, the method including continuously transmitting, over an open communication channel one or more tokens, generated by a token generator of a remote server, receiving, from the remote server, at least a second token, continuously sent to the server over a secured communication channel, from a second computerized device, and providing a service by a first computerized device as long as the continuously transmitted tokens are received at the first computerized device from the remote server.

There is thus provided, in accordance with some embodiments of the invention, a method of secure communication over an unsecure communication channel, the method including receiving, by a remote server over a secure communication channel, a communication request by a terminal upon detection of a computerized device in a predetermined distance therefrom, receiving, by the terminal, at least one access token from the server, sending, by the terminal, at least one access token to the computerized device, over an unsecure communication channel, sending, by the computerized device over a secure communication channel, the received at least one access token to the server and a command to be executed by the terminal, validating, by the server, the received at least one access token, sending, by the server, the command from the computerized device to the terminal, and executing the command by the terminal

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 shows a set or array of tokens with time slots or periods according to some embodiments of the present invention.

Figure 1:
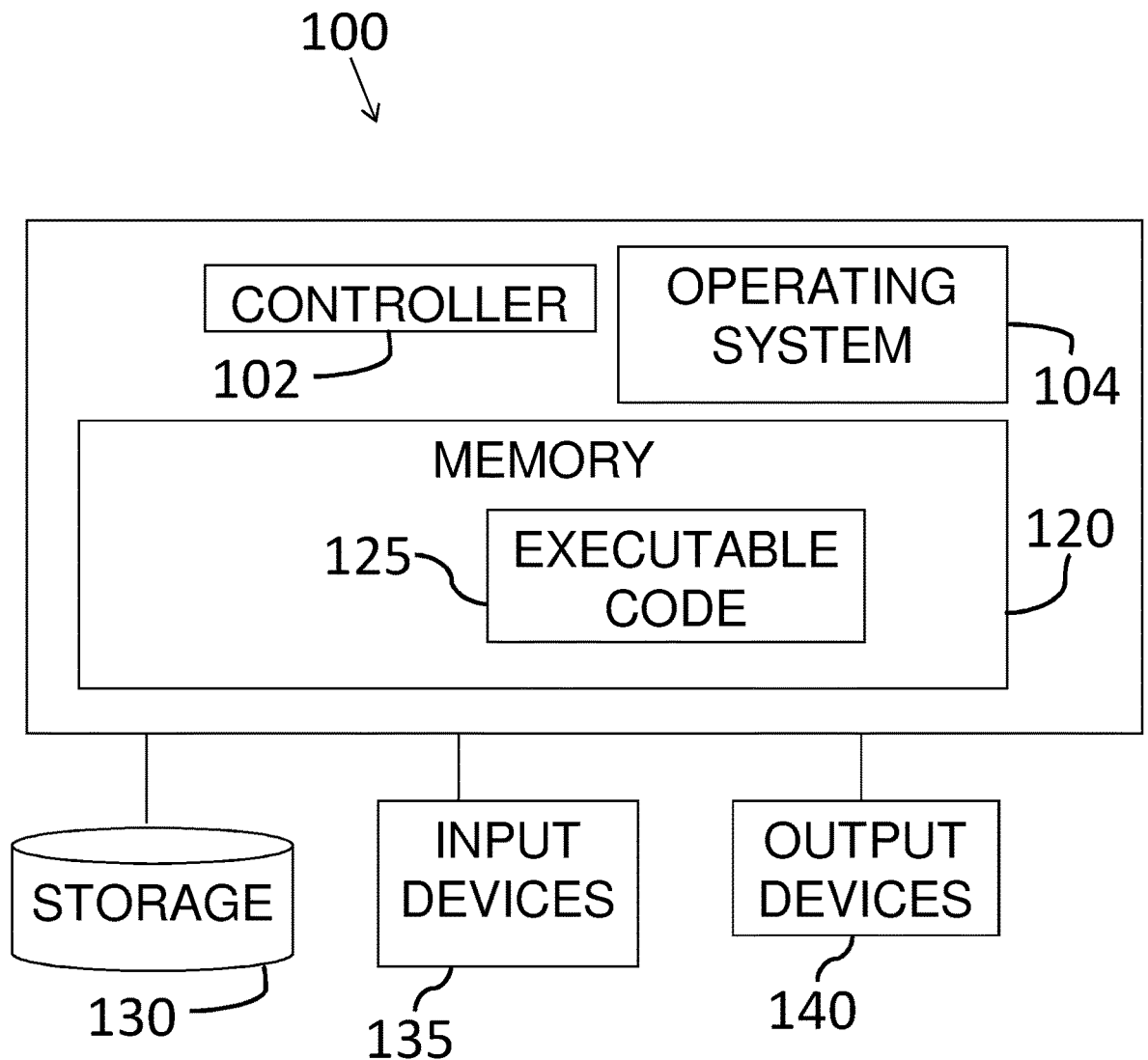
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which shows a block diagram of an exemplary computing device 100, according to some embodiments of the invention. Computing device 100 may include a controller 102 that may be, for example, a central processing unit processor (CPU), a chip or any suitable computing or computational device, an operating system 104, a memory 120, a storage 130, at least one input device 135 and at least one output device 140. Controller 102 may be configured to carry out methods as disclosed herein by for example executing code or software.

Operating system 104 may be or may include any code segment designed and/or configured to perform tasks involving coordination, scheduling, arbitration, supervising, controlling or otherwise managing operation of computing device 100, for example, scheduling execution of programs. Operating system 104 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 102 possibly under control of operating system 104. In some embodiments, more than one computing device 100 may be used. For example, a plurality of computing devices that include components similar to those included in computing device 100 may be connected to a network and used as a system.

Storage 130 may be or may include, for example, a hard disk drive, a universal serial bus (USB) device or other suitable removable and/or fixed storage unit. Content may be stored in storage 130 and may be loaded from storage 130 into memory 120 where it may be processed by controller 102. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC) or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 102.

The non-transitory storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
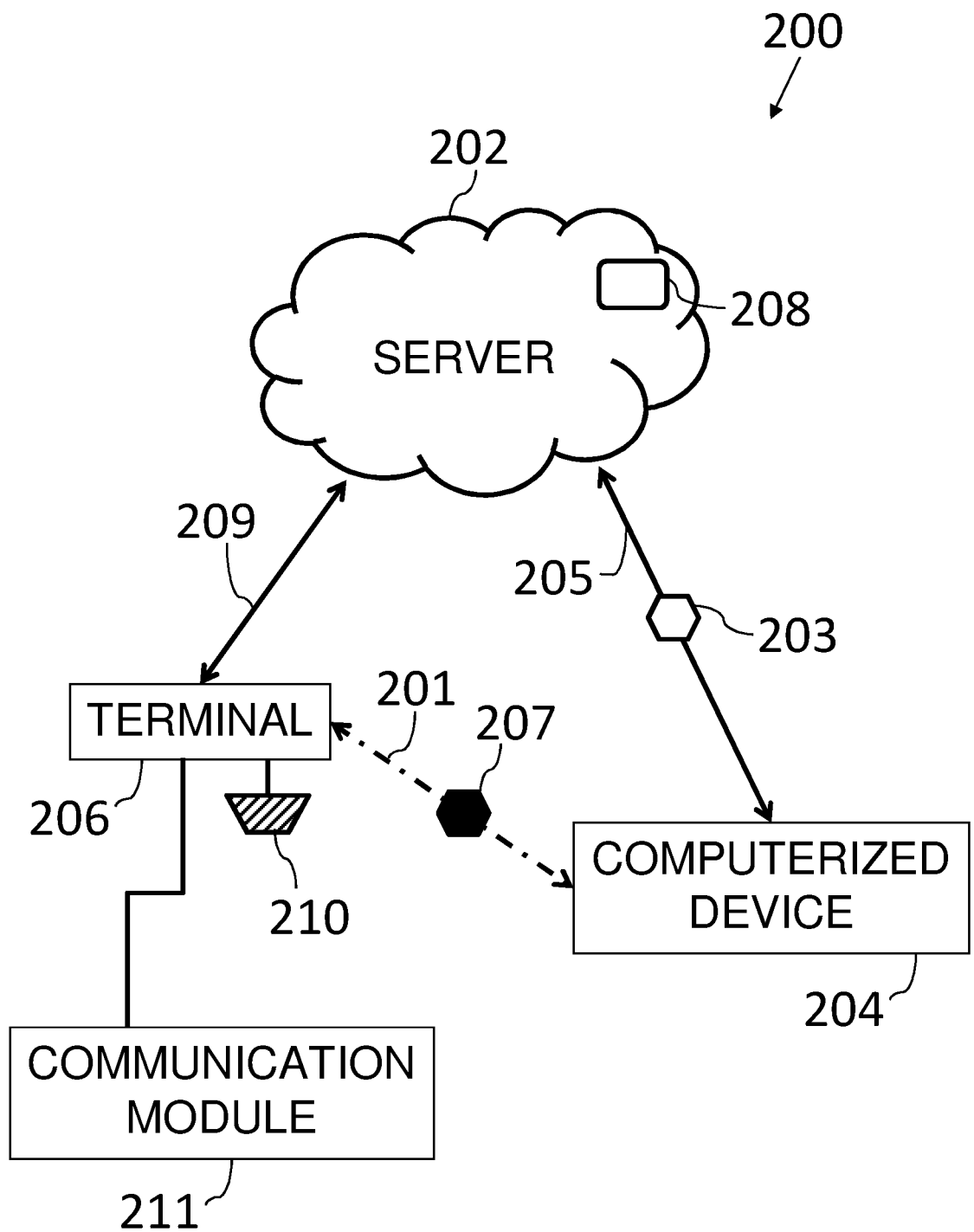
FIG. 2 schematically illustrates a block diagram of a first secure communication system, according to some embodiments of the invention.

Reference is now made to FIG. 2, which schematically illustrates a block diagram of a first secure communication system 200, according to some embodiments of the invention. It should be noted that the direction of arrows in FIG. 2 may indicate the direction of information flow. The first secure communication system 200 may allow securely communicating over an unsecure communication channel 201 (indicated with a dashed line), as further described hereinafter. First secure communication system 200 may include a server 202 configured to send at least one access token 203 to at least one computerized device 204 (such as computing device 100, shown in FIG. 1) over a first secured communication channel 205. It should be noted that computerized device 204 may be unidentified to server 202, such that at least one access token 203 may be sent to an unidentified device. For example, a smartphone 204 receiving an access token 203 (e.g., with randomly generated code) from a bank server 202, over a secured communication channel 205 such as a secured sockets layer (SSL), via a cellular network. It should be noted that an access token may include one or more of the security credentials for a login session and identify the user, the user's groups, the user's privileges, and, in some cases, a particular application. In some embodiments, each access token is unique.

In some embodiments, server 202 may send the at least one access token 203 to the (unidentified) computerized device 204 upon receipt of a command or a request from the computerized device 204. In some embodiments, the at least one access token 203 may be generated based on the received command In some embodiments, the communication within first secure communication system 200 may be at least partially wireless.

First secure communication system 200 may further include at least one terminal 206 configured to receive from the computerized device 204, over the unsecure communication channel 201, at least a second token 207 that is based on the access token 203 received by computerized device 204. It should be noted that computerized device 204 may be unidentified to terminal 206 and communication over the unsecure communication channel 201 may be between unidentified (or un-paired) parties. In some embodiments, second token 207 may be automatically generated (e.g., by computerized device 204) to include at least a portion of the information from received access token 203. In some embodiments, terminal 206 may be configured to execute commands received from the computerized device 204 once the received second token 207 is authenticated by terminal 206. In some embodiments, second token 207 may be identical to the access token 203 received by computerized device 204. According to some embodiments, a computerized device may be a terminal In some embodiments, the received at least one access token 203 may be temporarily stored in memory of computerized device 204 (such as memory 120, shown in FIG. 1) for processing. In some embodiments, server 202 may be configured to send at least one access token 203 to at least one terminal 206 over a first secured communication channel 209.

In some embodiments, server 202 may send the at least one access token 203 to the computerized device 204 upon receipt of at least one data packet (e.g., a serial number of the computerized device 204) from the computerized device 204. In some embodiments, terminal 206 may be configured to receive the at least one data packet from the computerized device 204 once the received access token 203 is authenticated. In some embodiments, server 202 may include a token generator 208 configured to generate access tokens based on the received at least one data packet. In some embodiments, the at least one data packet, from the computerized device 204, may include a unique identification of the computerized device 204. In some embodiments, the at least one data packet, from the computerized device 204, may include a command or request to be executed by the terminal 206.

In some embodiments, terminal 206 may be configured to send over a second secured communication channel 209, the received second token 207 to the server 202. In some embodiments, first secured communication channel 203 and second secured communication channel 209 may be the same channel with the server 202 communicating with different parties.

In some embodiments, server 202 may send the command for execution to the terminal 206 upon receipt of the second token 207, wherein the authentication of the second access token 207 may be performed by the server 202. In some embodiments, server 202 may send the command for execution to the terminal 206, wherein the authentication may be performed by the terminal 206. For example, the token 203 may be created according to a rule applied to corresponding data packets and/or the commands, such that if token 203 received from computerized device 204 and second token 207 received from server 202 are identical and/or match (e.g., according to the rule) terminal 206 may authenticate the token 207 and thereby perform the command.

According to some embodiments, first secure communication system 200 may further include at least one sensor 210, coupled to the terminal 206 and configures to detect presence of the computerized device 204 in a predetermined area in proximity to the at least one sensor 210. For example, an ATM 206 having a Bluetooth sensor 210 having a range of 20 meters and configured to detect presence of mobile devices 204 in the range of 2 meters connected to Bluetooth therewith. In some embodiments, the terminal 206 may receive from the computerized device 204 at least one access token 203 upon detection of the computerized device 204 in a predetermined area in proximity to the at least one sensor 210. In some embodiments, the at least one sensor 210 may be configured to determine the distance between the sensor 210 and the computerized device 204. For example, at least one sensor 210 may communicate with computerized device 204 and determine the distance therebetween based on the difference in time from sending and receiving a signal. According to another example, the distance may be determined according to the strength of a signal received from computerized device 204 (e.g., using a Bluetooth beacon transmitting at a constant strength). In some embodiments, the at least one sensor 210 may be configured to determine if the distance between the sensor 210 and the computerized device 204 changes during communication therewith. In some embodiments, the command may be performed according to a rule corresponding to a predefined distance between terminal 206 (e.g., an ATM) and a computerized device 204 (e.g., a smartphone). For example, an ATM operates only if a nearby device is in a distance smaller than 50 centimeters.

According to some embodiments, first secure communication system 200 may further include a communication module 211 coupled to the terminal 206 and configured to allow communication between the terminal 206 and the server 202. In some embodiments, communication module 211 may also be configured to allow communication between the terminal 206 and the computerized device 204. As may be apparent to one of ordinary skill in the art, unidentified (or un-paired) devices may thus securely communicate via first secure communication system 200 over the unsecure communication channel 201 using the tokens.

In some embodiments, the received at least one access token 203 may correspond to the terminal 204 to execute the received command. In some embodiments, the received at least one access token 203 may include a predetermined timeout period and expire after the timeout period elapses.

Figure 3:
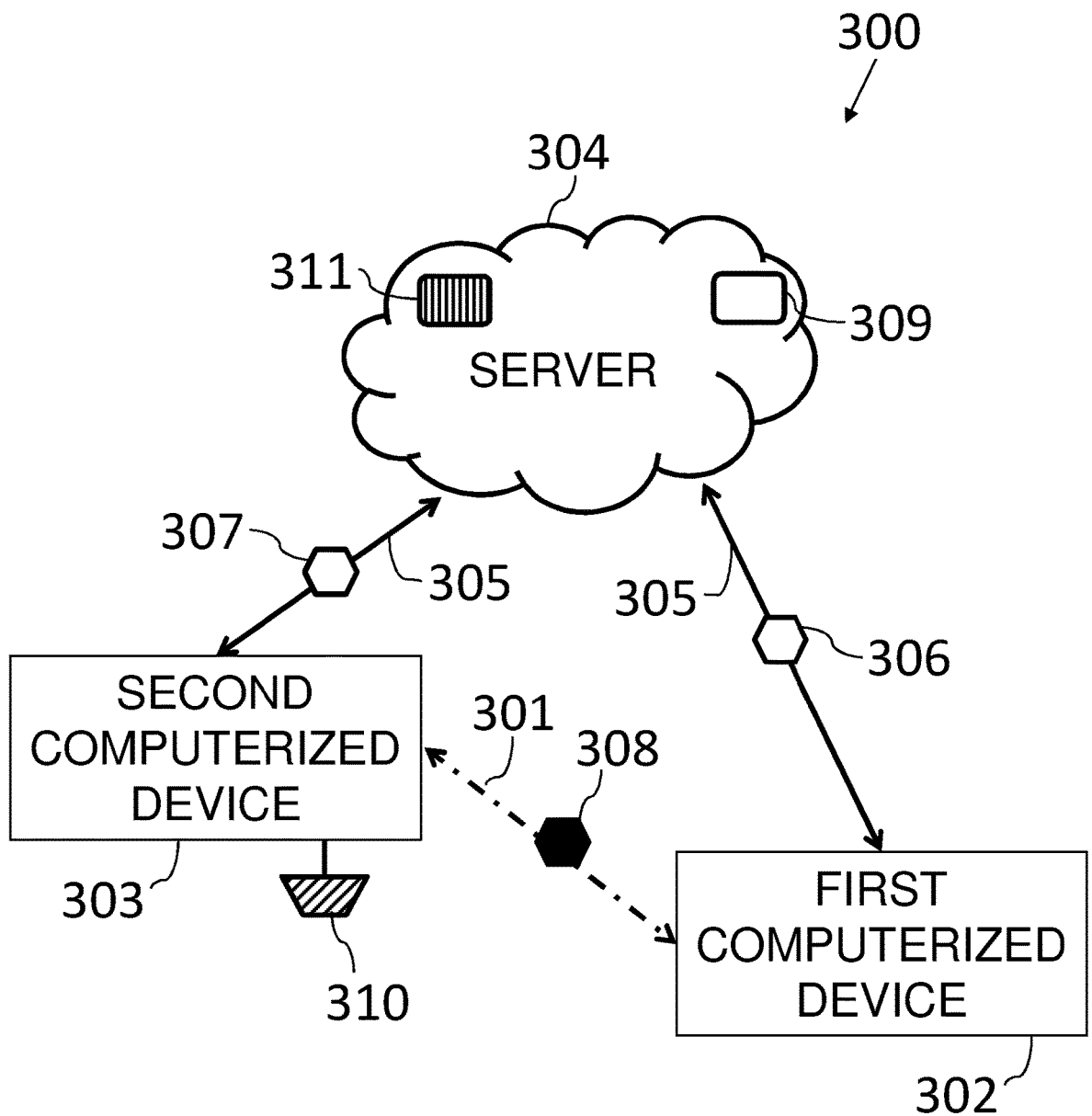
FIG. 3 schematically illustrates a block diagram of a second secure communication system, according to some embodiments of the invention.

Reference is now made to FIG. 3, which schematically illustrates a block diagram of a second secure communication system 300, according to some embodiments of the invention. It should be noted that the direction of arrows in FIG. 3 may indicate the direction of information flow. The second secure communication system 300 may allow securely communicating over an unsecure communication channel 301 (indicated with a dashed line), as further described hereinafter.

Second secure communication system 300 may include at least two computerized devices, with a first computerized device 302 and a second computerized device 303, wherein the at least two computerized devices 302, 303 are in active communication therebetween over the unsecure communication channel 301. In some embodiments, the at least two computerized devices may be unidentified therebetween (e.g., the two computerized devices are strangers to each other) such that secure communication without second secure communication system 300 may not be possible, since secure communication system 300 allows secure communication between unidentified devices.

In some embodiments, second secure communication system 300 may further include a server 304, in active communication with each of the at least two computerized devices 302, 303 over a secure communication channel 305. In some embodiments, first computerized device 302 may be configured to transmit a request or first data packet 306 to the server 304 over the secure communication channel 305. In some embodiments, second computerized device 303 may be configured to transmit a second data packet 307 to the server 304 over the secure communication channel 305.

In some embodiments, server 304 may generate a token 308, and transmit the token 308 over the secured communication channel 305 back to the first device 302. In some embodiments, second computerized device 303 may receive from the first computerized device 302, over the unsecure communication channel 301, the token 308 received from the server 304. In some embodiments, second computerized device 303 may determine compliance of the token 308. In some embodiments, first data packet 306 may be a request (or command) for execution, and second computerized device 303 may execute the request based on the determined compliance.

In some embodiments, second computerized device 303 may receive from the server 304, over the secured communication channel 305, the first data packet 306 sent from the first computerized device 302, and the first computerized device 302 may receive from the server 304, over the secured communication channel 305, the second data packet 307 sent from the second computerized device 303.

In some embodiments, the server 304 may include a first token generator 309 configured to generate tokens 308 based on the received first data packet 306. In some embodiments, the server 304 may include a second token generator 311 configured to generate modified tokens to be sent simultaneously with tokens 308 generated by the first token generator 309. For example, second token generator 311 may generate modified tokens that are only distinguishable by second secure communication system 300 such that external elements and/or devices may not distinguish between the modified tokens and the unmodified tokens. As may be apparent to one of ordinary skill in the art, unidentified (or un-paired) devices may thus securely communicate via second secure communication system 300 over the unsecure communication channel 301 using the tokens.

According to some embodiments, second secure communication system 300 may further include at least one sensor 310, coupled to the second computerized device 303 and configures to detect presence of the first computerized device 302 in a predetermined area in proximity to the at least one sensor 310. In some embodiments, the second computerized device 303 may receive from the first computerized device 302 at least one token 308 upon detection of the first computerized device 302 in a predetermined area in proximity to the at least one sensor 310. In some embodiments, the at least one sensor 310 may be configured to determine the distance between the sensor 310 and the first computerized device 302. In some embodiments, the at least one sensor 310 may be configured to determine if the distance between the sensor 310 and the first computerized device 302 changes during communication therewith. According to one example, the distance may be determined according to the strength of a signal received from first computerized device 302 (e.g., using a Bluetooth beacon transmitting at a constant strength).

Figure 4:
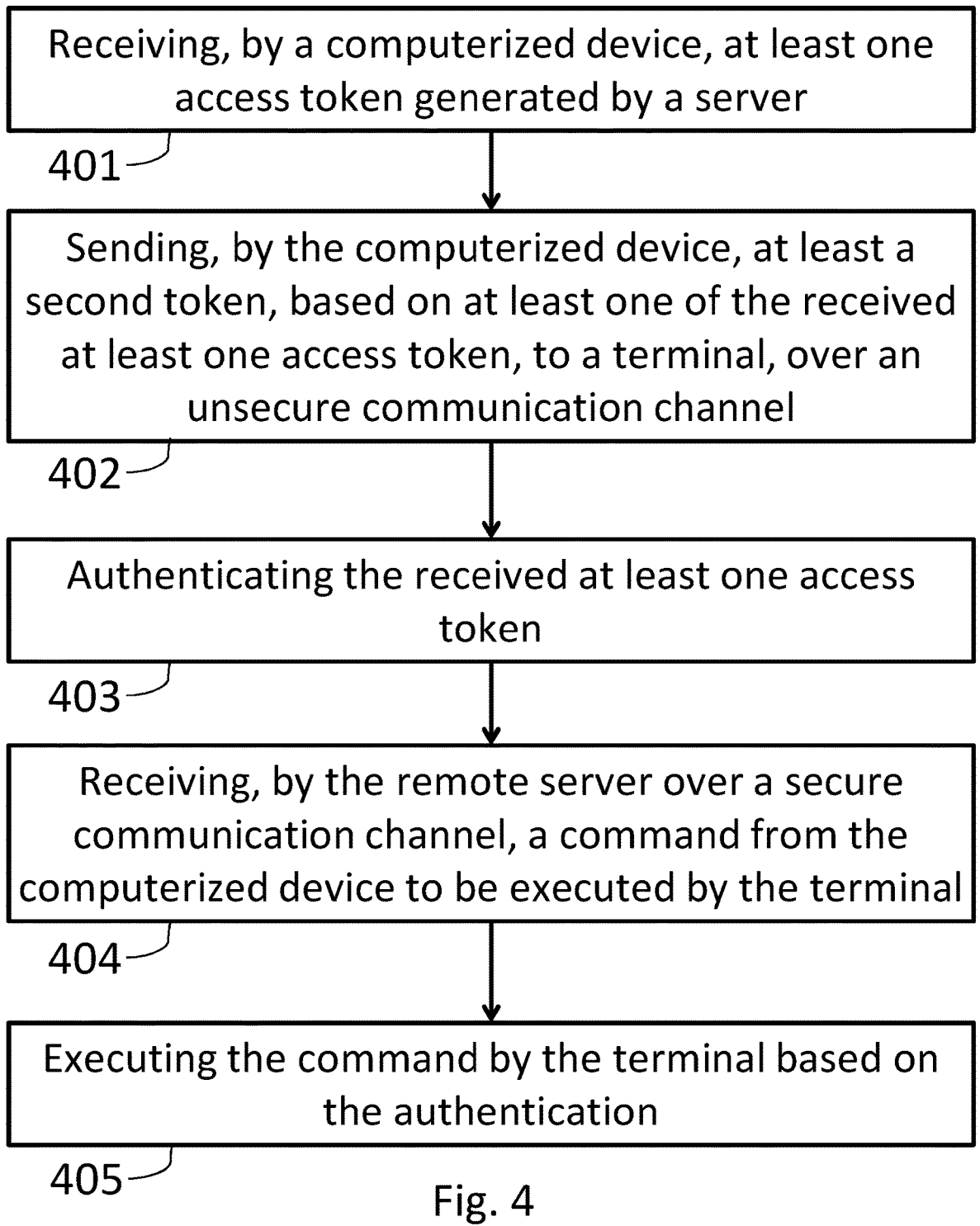
FIG. 4 shows a flowchart illustrating a method of secure communication over an unsecure communication channel, according to some embodiments of the invention.

Reference is now made to FIG. 4, which shows a flowchart illustrating a method of secure communication over an unsecure communication channel, according to some embodiments of the invention. In some embodiments, a computerized device (e.g., such as computerized device 204, shown in FIG. 2) may receive 401, at least one access token generated by a server (e.g., such as server 202, shown in FIG. 2). In some embodiments, the computerized device may send 402 at least a second token, based on at least one of the received at least one access token, to a terminal (e.g., such as terminal 206, shown in FIG. 2), over an unsecure communication channel. In some embodiments, the received at least one access token may be authenticated 403. In some embodiments, the authentication may include comparing the received access token and the access token generated by the server. In some embodiments, the remote server may receive 404 over a secure communication channel, a command from the computerized device to be executed by another computerized device, such as the terminal, wherein the command may be executed 405 by the terminal based on the authentication. In some embodiments, the authentication may further include determining compliance of the received token with at least one rule. For example, the rule may identify "legal" tokens. Tokens that do not fit the rule (for example ones fabricated by a hacker) are not sent to remote server thereby increasing security and preventing taxing system resources, e.g., Distributed Denial of Service (DDoS).

In some embodiments, the token may be generated by applying a token generation algorithm on the received command and wherein compliance may be determined if the received token corresponds with the received command. According to some embodiments, a token generation algorithm may include generation of a token with a constant number of bits that correspond (e.g., a hash function) to the command number, for instance from a list of predetermined commands In some embodiments, a token generation algorithm may include generation of a token with a mathematical product of primary numbers and/or mathematical product of a primary number and a random number generation (RNG) and/or cryptographically secure pseudorandom number generation.

In some embodiments, each of the at least one rule may be associated with an action to be performed by at least one terminal, and wherein each of the at least one terminal may be configured to execute the action associated with the at least one rule, according to the compliance of the received token with the rule associated with the action.

In some embodiments, the terminal may send over a secure communication channel, the received at least one access token to the server, and the server may send the command from the computerized device to the terminal, wherein the authentication may be performed by the server. In some embodiments, the server may send the command from the computerized device to the terminal, wherein the authentication may be performed by the terminal For example, the token may be created according to a rule applied to corresponding data packets and/or the commands, such that if token received from computerized device and second token received from server are identical and/or match (e.g., according to the rule) terminal may authenticate the token and thereby perform the command In some embodiments, the at least one rule (e.g., for noise filtration) may include data bits of a predetermined order, such as having the first bit as '1' and/or having half bits as '1' and the other half as '0', and/or calculating a mathematical product between a random number and a primary number.

In some embodiments, the computerized device may receive, a token pattern from the server, the computerized device may send an identification number of the computerized device to the server if the received access token complies with the received token pattern. In some embodiments, an alert may be issued to the server upon detection of an access token that does not comply with the received token pattern. In some embodiments, at least one access token may be randomly created by the server.

In some embodiments, at least one sensor (e.g., such as sensor 210, shown in FIG. 2) may detect presence of the computerized device in a predetermined area in proximity to the at least one sensor. In some embodiments, the at least one sensor may determine the distance between the sensor and the computerized device, wherein sending of access tokens to the computerized device may be blocked if the determined distance is larger than a predetermined value.

In some embodiments, the computerized device may send at least a third token, wherein the at least third token is a fake token.

In some embodiments, the computerized device may receive at least one set of tokens such as the set or array illustrated in FIG. 5. each of the tokens in the set of tokens, has an expiration period. Computerized device may then send at least a second token which may be based on at least one token of the set of tokens. According to some embodiments, the one or more second tokens may be identical to the token or tokens in the set of tokens received from server, or may be modified to include additional or alternative data, such as the identity of the computerized device.

According to some embodiments, remote server may produce an array such of consecutive tokens each with a time slot, e.g., like the array illustrated in FIG. 5, and the computerized device may broadcast each token only during the timeslot assigned to each token.

According to some embodiments, authenticating of the tokens received at a second computerized device (e.g., terminal 206 in FIG. 2) may include checking that the at least second token is received prior to the expiration period of the at least second token has elapsed. In some embodiments, tokens may be sent in accordance with their expiration period. In some embodiments, tokens may be sent according to predetermined time periods or according to another preset order.

According to some embodiments, a plurality of different tokens (e.g., such as the tokens in FIG. 5), generated by a token generator of a remote server, may be continuously transmitted for instance while a computerized device is present nearby. In some embodiments, at least a plurality of second tokens corresponding to the plurality of different tokens, received from the remote server, may be continuously sent to the server over a secured communication channel, from a second computerized device (e.g., such as computerized device 303, shown in FIG. 3). In some embodiments, a service by the first or second computerized device may be provided as long as the continuously transmitted tokens are received at the first computerized device from the remote server.

According to some embodiments, a remote server may receive over a secure communication channel, a communication request by a terminal upon detection of a computerized device in a predetermined distance therefrom. In some embodiments, the terminal may receive at least one access token from the server. In some embodiments, the terminal may send at least one access token to the computerized device over an unsecure communication channel. In some embodiments, the computerized device may send over a secure communication channel, the received at least one access token to the server and a command to be executed by the terminal In some embodiments, the server may validate the received at least one access token. In some embodiments, the server may send the command from the computerized device to the terminal. In some embodiments, the command may be executed by the terminal.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A secure communication system for communication over an unsecure communication channel, the system comprising:
   at least two computerized devices, wherein the at least two computerized devices are in active communication therebetween over the unsecure communication channel, and wherein the at least two computerized devices are unidentified while communicating over the unsecure communication channel; and
   a server, in active communication with each of the at least two computerized devices over a secure communication channel,
   wherein a first computerized device of the at least two computerized devices, is configured to transmit a first data packet to the server over the secure communication channel,
   wherein the server is configured to:
   generate a token based on the first data packet; and
   transmit the token over the secured communication channel back to the first computerized device,
   wherein a second computerized device, of the at least two computerized devices, is configured to:
   transmit a second data packet to the server over the secure communication channel;
   receive from the first computerized device, over the unsecure communication channel, the token received from the server, wherein the first computerized device broadcasts the token over the unsecure communication channel without pairing to other devices;
   determine compliance of the token; and
   receive from the server, over the secured communication channel, the first data packet sent from the first computerized device, and
   wherein the first computerized device is configured to receive from the server, over the secured communication channel, the second data packet sent from the second computerized device.

2. The system of claim 1, further comprising at least one sensor, coupled to the second computerized device and configured to:
   detect presence of the first computerized device in a predetermined area in proximity to the at least one sensor; and
   determine a distance between the sensor and the first computerized device, based on strength of a signal received from the first computerized device,
   wherein the second computerized device is configured to receive from the first computerized device the token upon detection of the first computerized device in a predetermined area in proximity to the at least one sensor.

3. The system of claim 2, wherein the at least one sensor is configured to determine if the distance between the sensor and the first computerized device changes during communication therewith.

4. The system of claim 1, wherein the received token comprises a timeout period and expires after the timeout period elapses, and wherein the token is received only during a timeslot assigned to that token.

5. The system of claim 1, wherein the first data packet is a request for execution, and wherein the second computerized device executes the request based on the determined compliance.

6. The system of claim 1, wherein the server further comprises a first token generator to generate tokens based on the received first data packet.

7. The system of claim 6, wherein the server further comprises a second token generator to generate modified tokens to be sent simultaneously with tokens generated by the first token generator.

8. The system of claim 1, wherein the first computerized device is further configured to:
   receive a token pattern from the server;
   send an identification number of the first computerized device to the server if the received token complies with the received token pattern; and
   issue an alert to the server upon detection of a token that does not comply with the received token pattern.

9. The system of claim 1, wherein the server generates an array of consecutive tokens each with a time slot, and wherein the first computerized device broadcasts each token only during the timeslot assigned to each token.

10. A secure communication system for location based communication over an unsecure communication channel, the system comprising:
    at least two computerized devices, wherein the at least two computerized devices are in active communication therebetween over the unsecure communication channel, and are unidentified while communicating over the unsecure communication channel; and
    a server, in active communication with each of the at least two computerized devices over a secure communication channel,
    wherein a first computerized device of the at least two computerized devices, is configured to transmit a request to the server over the secure communication channel,
    wherein the server is configured to:
    generate a token based on the request; and
    transmit the token over the secured communication channel back to the first computerized device,
    wherein a second computerized device, of the at least two computerized devices, is configured to:
    receive from the first computerized device, over the unsecure communication channel, the token received from the server, wherein the first computerized device broadcasts the token over the unsecure communication channel without pairing to other devices;
    receive from the server, over the secured communication channel, the request sent from the first computerized device, and
    determine compliance of the token and the request and execute the request based on the determined compliance.

11. The system according to claim 10, wherein the server comprises a first token generator, wherein the first token generator is configured to generate the token based on the received request.

12. The system according to claim 11, wherein the server comprises a second token generator, wherein the second token generator is configured to generate modified tokens to be sent simultaneously with tokens generated by the first token generator, wherein the modified tokens are only distinguishable from tokens generated by the first token generator by the server.

13. The system according to claim 11, wherein the at least two computerized devices are located within a predefined distance from each other, and wherein communication over the unsecure communication channel is carried out based on a relative distance between the at least two computerized devices.

14. The system according to claim 10, further comprising at least one sensor, coupled to the second computerized device and configured to detect presence of the first computerized device in a predetermined area in proximity to the at least one sensor and configured to determine a distance between the sensor and the first computerized device, based on strength of a signal received from the computerized device, wherein the second computerized device is configured to receive from the first computerized device the token upon detection of the first computerized device in a predetermined area in proximity to the at least one sensor.

15. The system according to claim 10, wherein the received token comprises a timeout period and expires after the timeout period elapses, and wherein the token is received only during a timeslot assigned to that token.

16. The system according to claim 10, wherein the server generates an array of consecutive tokens each with a time slot, and wherein the first computerized device broadcasts each token only during the timeslot assigned to each token.

* * * * *